Oct. 25, 1966  D. H. HANSEN  3,281,167
METHOD AND APPARATUS FOR POSITIONING PARTS
TO EXTREME ACCURACIES
Filed Jan. 8, 1962

INVENTOR
DONALD H. HANSEN
BY
Brumbaugh, Free, Graves
and Donohue
HIS ATTORNEYS 3,281,167
METHOD AND APPARATUS FOR POSITIONING PARTS TO EXTREME ACCURACIES
Donald H. Hansen, Northampton, Mass., assignor to Kollmorgen Corporation, Northampton, Mass., a corporation of New York
Filed Jan. 8, 1962, Ser. No. 164,799
10 Claims. (Cl. 287—20.5)

This invention relates to novel methods and apparatus for positioning and aligning articles with extreme accuracy and particularly for positioning and aligning optical elements, such as, lens elements, lenses, prisms, mirrors and the like.

Parts which must be positioned accurately are usually lapped into position. In lapping operations, a small amount of abrasive is placed between the part and its setting and they are then moved relatively until the part is seated properly. The pressure is applied to the part or the setting or both. The relative motion imparted thereto in order to properly lap them in position requires a sensitive touch, patience and experience. Accordingly, unskilled personnel are incapable of doing precision lapping and even skilled craftsmen require considerable time to position a part accurately, so that lapping operations are generally expensive.

In accordance with the present invention a process is provided whereby the time required for positioning optical elements and other parts such as fixtures, fittings, gauges, and the like is greatly reduced and relatively unskilled personnel can position such elements or parts with great accuracy.

More particularly in accordance with the invention, the part to be positioned is mounted on one or more pads each having a substantially rounded semi-spherical surface and mating with a corresponding socket in the part to be positioned or in a seat or support therefor. A fine abrasive, such as emery dust, is introduced between the rounded surfaces of the pads and their sockets. The entire assembly of the part, pads and base are pressed together by means of resilient elements, weights, mounting screws or the like and the pads and sockets are rotated selectively relative to each other to grind the confronting surfaces of the pads and sockets until the part is accurately positioned with respect to its support.

For a better understanding of the present invention reference may be had with the accompanying drawings in which.

Figure 1:
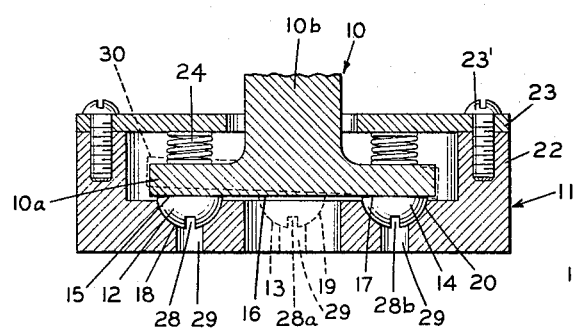
FIGURE 1 is a view in vertical section of a typical part to be positioned and mount therefor.
Figure 2:
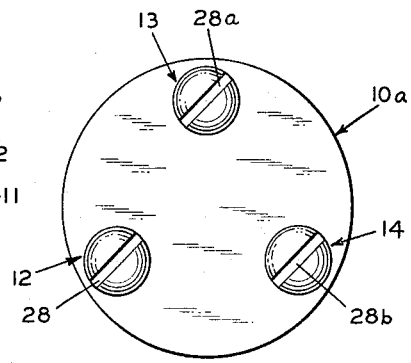
FIGURE 2 is a bottom plan view of the part to be positioned with the mounting pads positioned thereon.
Figure 3:
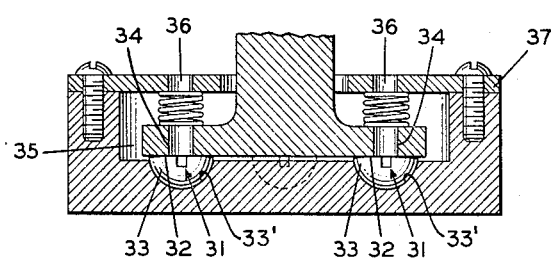
FIGURES 3, 4, 5 and 6 are views in section of modified forms of mounts and parts to be positioned thereon in accordance with the invention.

A typical assembly to illustrate the invention includes a part 10 to be positioned such as a support for a mirror, lens, prism or the like and a mounting member or mount 11 is illustrated in FIGURES 1 and 2.

The support 10 has a base 10a and a stem 10b. Interposed between the base 10a and the mount 11 are three substantially hemispherical pads 12, 13 and 14, which have flat surfaces 15, 16, 17, engaging the base. The surfaces 15 to 17 and the opposed surfaces on the support 10 may be and preferably are ground substantially optically flat.

Sockets 18, 19, and 20 are formed in the mount 11 and have concave substantially semi-spherical surfaces to receive the rounded faces of the respective pads 12, 13 and 14.

As illustrated particularly in FIG. 1, the mount 11 is a cup-shaped member having a peripheral rim 22. An annular ring 23 is secured by screws 23' to the rim 22 of the mount 11. Springs 24 are interposed between ring 23 and base 10a of support 10 to bias the support 10 toward the mount 11 so that the mounting pads 12, 13 and 14 are pressed into corresponding sockets 18, 19 and 20.

Slots 28, 28a and 28b are formed in the bottoms of pads 12, 13, and 14 to receive a screwdriver for rotating the pads and are accessible through corresponding holes 29 in mount 11.

In order to align the support 10 with the mount 1, a fine abrasive powder such as emery dust is placed in the sockets 18, 19, and 20. As machined, the support 10 will be in approximate alignment with the mount 11 as shown schematically by dotted line 30 in FIGURE 1, but further adjustment is required for positioning the support precisely with respect to the mount 11. Adjustment is accomplished by turning one of the pads, for example, pad 12 with a screwdrive. The abrasive in the socket 18 will wear away the pad or the socket or both so that the support 10 tilts and moves closer to its proper position relative to the mount 11.

Inasmuch as the flat surfaces on the pads 15, 16 and 17 will always engage the base flatly, their flat surfaces will all lie in essentially a single plane and movement of a pad, such as pad 12, further into its mating socket will cause the other two pads, 13 and 14 to rotate or tilt in their seats, as the plane of the base 10a tilts.

The rotation of the pads, 12, 13 and 14 around the axes perpendicular to their flat surfaces 15, 16 and 17, causes the softer substance, i.e., either the pad or the mount, to be charged with abrasive. By rotating or oscillating the appropriate pad or pads the support 10 can be adjusted relative to the mount 11 to an accuracy limited only by the capabilities of the equipment for indicating the alignment of the support. An infinitesimal cam action exists on each pad and set, which greatly simplifies the final adjustment.

Abrasive material is left under the pad, thereby aiding in maintaining the alignment of the pad and socket with almost complete surface contact. Relative motion between the support and the pads, such as would be caused by a difference in thermal expansion, does not affect the adjustment because this motion will always be at 90° to the adjustment direction. Adjustment is affected only by rotation of the pad.

Additional embodiments of the invention are shown in FIGURES 3, 4, 5 and 6. In the modification shown in FIGURE 3, a screwdriver slot 31 is formed in the flat surface 32 of each hemispherical mounting pad 33 which are, in turn, rotatably received in sockets 33', and access to these slots is had through holes 34 in the base of the support 35 and aligned holes 36 in annular ring 37.

Figure 4:
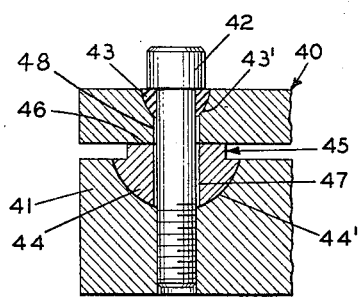

In the modification of FIGURE 4, the springs 24 of FIG. 1 have been omitted. Pressure between the part 40 and the mount 41 is obtained by means of machine screw 42 and small masses 43 of resilient material, such as rubber, inserted in the countersink 43' in part 40. Mounting pad 44 is rotated in socket 44' by means of wrench engaging flats 45 adjacent to its base 46. Clearance is left between screw 42 and pad 44 at 47 and the base 40 at 48 to permit tilting of pad 44 and base 48 relative to screw 42 as pad 44 is rotated.

Figure 5:
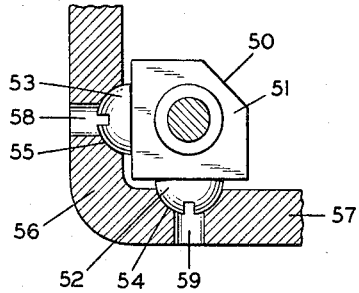

FIGURE 5 illustrates the manner in which a part is mounted in a corner of a frame, tube or the like. Pressure may be applied by means of a spring, resilient pad or the like (not shown) against the slanting surface 50 on the part 51 to urge the pads 52 and 53 into the sockets 54 and 55 adjacent to the corner 56 of the frame 47. A screwdriver is inserted through holes 58 and 59 in the frame to rotate the pads and seat them into the desired position.

Figure 6:
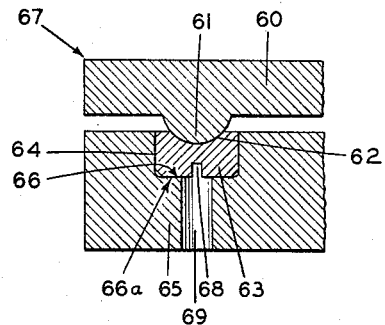

FIGURE 6 illustrates an embodiment in which the socket is rotated relative to the pad. Base 60 of the part to be positioned has integrally formed thereon a pad 61 having a semi-spherical surface. Socket 62 receiving pad 61 is formed in a cylindrically shaped socket carrier member 63. A cylindrically shaped recess 64 in base 65 receives member 63. The bottom surface 66 of member 63 and the corresponding surface 66a of recess 65 are preferably substantially optically flat. Spring means, not shown, press against the top surface 67 of base 60 to urge the base 60 and pad 61 into socket 62. A screwdriver receiving slot 68 is provided in member 63 and are accessible through hole 69 in base 65 for rotating the socket member 63.

As in the case of the arrangement of FIGURE 1, abrasive material is introduced between the pads 33, 44, 52, 53 and 61 and their corresponding sockets 33', 44', 54, 55 and 62 of the modifications of FIGS. 3, 4, 5 and 6 to effect the abrasive action as the pads are rotated in their sockets.

While the invention has been described with reference to the positioning of mounts for mirrors and the like in supporting bases or frames, it will be understood that other optical elements, machine elements, fixtures and other structural members requiring precision adjustment may be located, aligned or positioned in a similar manner. Moreover, the shape of the pads and the means for rotating them may be modified in accordance with requirements. Accordingly, the examples described herein should be considered as illustrative.

I claim:

1. An apparatus for accurately aligning elements adapted to be positioned relative to each other, comprising means interposed between said elements and holding them in spaced relation at a plurality of points including at least one pad having a rounded surface facing away from one of said elements and toward the other, a socket in the other element having a rounded surface facing away from the other of said elements and toward said one element for receiving the rounded surface of said pad, one of said pad and socket also having a substantially optically flat surface facing in a direction opposite to that of its rounded surface, a substantially optically flat surface on the element facing the first mentioned flat surface and engaging therewith, means for urging said elements toward each other to hold said pad firmly in said socket and said flat surfaces against each other, and abrasive material on one of said rounded surfaces of said pad and socket, and means for rotating said pad and said socket relative to each other.

2. An apparatus for accurately aligning elements adapted to be positioned relative to each other, comprising a plurality of mounting pads together comprising a set interposed between said elements, each of said pads having a substantially semi-spherical surface facing away from one of said elements and toward the other, a plurality of sockets together comprising a set in the other element each having a rounded surface facing away from the other of said elements and toward said one element for receiving the rounded surface of one of said pads, one set of said pads and sockets having a substantially optically flat surface facing in a direction opposite to that of its rounded surfaces, a substantially optically flat surface on the element facing the first mentioned flat surface and engaging therewith, means for urging said elements toward each other to urge pads into said sockets and said flat surface of said element against the first mentioned flat surface, an abrasive material disposed within at least one of said sockets, and means for turning said pads and said sockets relative to each other to seat them in said sockets.

3. An apparatus for accurately aligning elements adapted to be aligned, comprising means interposed between said elements for holding them in spaced relation at a plurality of points including at least one pad having a substantially semi-spherical surface and a substantially optically flat surface, a socket having a substantially semi-spherical surface in one of said elements to receive said pad, and a substantially optically flat surface on the other of said elements engaging said flat surface of said pad, means for urging said elements toward each other to hold said pad in the socket in the first of said elements and to hold the second of said elements against said pad, an abrasive material disposed within said socket, and means for rotating said pad and said socket relative to each other.

4. An apparatus for accurately aligning elements comprising a mounting member having an open mouth and a rim forming a cup, an annular ring member having an opening therethrough of a dimension smaller than the mouth of said mounting member, a base member positioned within the mouth of said mounting member and having an outer dimension larger than the opening in said annular ring, said annular ring being secured to the rim of said mounting member and holding said base member therein, at least one socket in one of said base and mounting members having a substantially concave surface, means holding said base member in spaced relation to said mounting member at a plurality of points including at least one pad, said pad having a rounded surface engaging said socket, spring means engaging said base member and said ring member for urging said base member against said pad and said pad into said socket, an abrasive material disposed within said socket, and means for rotating said pad and said socket relative to each other.

5. An apparatus for accurately aligning elements comprising a mounting member having an open mouth and a rim forming a cup, an annular ring member having an opening therethrough of a dimension smaller than the mouth of said mounting member, a base member having an outer dimension larger than the opening of said annular ring member, said base member fitting into the mouth of said mounting member, a stem member fixed to said base member and extending through the opening in said ring member, and said ring member being secured to the rim of said mounting member for holding said base member therein, three sockets in one of said base and mounting members having a concave surface, three pads for holding said base member in spaced relation to said mounting member, each pad having a rounded surface engaging in a corresponding socket, spring means urging said base against said pads and said pads into said sockets, an abrasive material disposed within said sockets, and means for rotating said pads and said sockets relative to each other.

6. An apparatus according to claim 5 wherein said pads are mounted for movement relative to said base member and said means for rotating said pads and sockets relative to each other comprises a slot in each of said pads for receiving a screwdriver.

7. An apparatus according to claim 5 wherein said pads are mounted for movement relative to said base member and said means for rotating said pads and sockets relative to each other comprises wrench receiving flats on each of said pads.

8. An apparatus for accurately aligning elements adapted to be aligned, comprising means interposed between said elements for holding them in spaced relation at a plurality of points including a plurality of pads each having a substantially semi-spherical surface and a substantially optically flat surface, a plurality of sockets each having a substantially semi-spherical surface in one of said elements to receive one of said pads, and a substantially optically flat surface on the other of said elements engaging said flat surface of said pads, means for urging said elements toward each other to hold said pads in the sockets in the first of said elements and to hold the second of said elements against said pads, an abrasive material disposed within said sockets, and means for selectively rotating each of said pads and said sockets relative to each other.

9. An apparatus according to claim 8 wherein each of said pads is mounted for rotation about an axis extending perpendicular to the plane of said flat surfaces.

10. An apparatus according to claim 9 wherein the opposed surfaces of said pads and sockets are constructed of abradable material of different hardnesses.

References Cited by the Examiner
UNITED STATES PATENTS

| | | | |
|---|---|---|---|
| 479,196 | 7/1892 | Paoli | 248—178 |
| 2,075,216 | 3/1937 | Mancuso | 51—27 |
| 2,115,274 | 4/1938 | Mc Cabe | 248—194 |
| 2,216,387 | 10/1940 | Haag-Streit | 248—194 |
| 2,345,177 | 3/1944 | Briney | 51—27 X |
| 2,453,709 | 11/1948 | Hughes | 51—281 |
| 2,461,190 | 2/1949 | Wolff | 248—180 |
| 2,676,045 | 4/1954 | Moskovitz. | |
| 2,723,821 | 11/1955 | Kelly et al. | 248—179 |
| 2,922,264 | 1/1960 | Mushrush | 51—281 |

CARL W. TOMLIN, *Primary Examiner.*

JOHN C. CHRISTIE, *Examiner.*

A. V. KUNDRAT, *Assistant Examiner.*